US006704982B1

(12) United States Patent
Cassese et al.

(10) Patent No.: US 6,704,982 B1
(45) Date of Patent: Mar. 16, 2004

(54) AUTOMATIC MACHINE FOR ASSEMBLING FRAMES

(75) Inventors: Pierre Cassese, St. Quen en Brie (FR); Alain Cassese, Breau (FR); Jean Cassese, Lieusaint (FR); Philippe Cassese, St. Germain Laxis (FR)

(73) Assignee: Societe Cassese S.A., Verneuil l'Etang (FR)

( * ) Notice: Subject to any disclaimer, the term of this patent is extended or adjusted under 35 U.S.C. 154(b) by 14 days.

(21) Appl. No.: 10/089,090

(22) PCT Filed: Oct. 10, 2000

(86) PCT No.: PCT/FR00/02806

§ 371 (c)(1),
(2), (4) Date: Jul. 11, 2002

(87) PCT Pub. No.: WO01/26867

PCT Pub. Date: Apr. 19, 2001

(30) Foreign Application Priority Data

Oct. 14, 1999 (FR) .......................................... 99 12809

(51) Int. Cl.[7] .............................................. B23P 17/00

(52) U.S. Cl. ..................... 29/33 K; 29/564.8; 29/56.6; 29/795; 29/798; 29/469; 29/430; 29/564.2; 144/345; 144/353; 144/355; 144/2.1; 144/4.2; 227/148; 227/152; 227/21

(58) Field of Search ................................ 29/33 K, 564, 29/564.1, 564.2, 564.7, 564.8, 56.6, 772, 787, 795, 798, 469, 430; 144/345, 353, 355, 2.1, 4.2; 227/148, 145, 152, 21, 39, 151

(56) References Cited

U.S. PATENT DOCUMENTS

| | | | | | |
|---|---|---|---|---|---|
| 203,486 | A | * | 5/1878 | Myers | 144/353 |
| 3,699,622 | A | * | 10/1972 | Frydenberg | 29/795 |
| 3,734,381 | A | * | 5/1973 | Blevio | 227/148 |
| 4,127,226 | A | * | 11/1978 | Jasper | 227/148 |
| 4,592,401 | A | * | 6/1986 | Vanago | 144/346 |
| 5,119,854 | A | * | 6/1992 | Chanoine et al. | 144/4.7 |
| 5,149,236 | A | | 9/1992 | Rapayelian | |
| 6,089,434 | A | * | 7/2000 | Gleason | 227/152 |

FOREIGN PATENT DOCUMENTS

| | | | |
|---|---|---|---|
| DE | 27 47 314 | A | 4/1979 |
| FR | 2 609 925 | A | 7/1988 |
| FR | 2 674 789 | A | 10/1992 |

* cited by examiner

*Primary Examiner*—Erica Cadugan
(74) *Attorney, Agent, or Firm*—Arent Fox Kintner Plotkin & Kahn

(57) ABSTRACT

The machine comprises two independent fastening stations. The first station (2), designed to assembly the corners of the frame separately and successively, is provided with two cutting heads (3, 7) for cutting the mouldings (5, 9) forming the corner of the frame, as well as with a fastening head (11) and devices with stops (6, 10) and jaws (14) for holding mouldings in position. The second station (15), designed for final assembly of the frame, is provided with two fastening heads (19, 20) installed facing each other along the diagonal of the frame to be produced.

8 Claims, 3 Drawing Sheets

AUTOMATIC MACHINE FOR ASSEMBLING FRAMES

The invention falls within the field of framing and relates, more precisely, to a machine enabling the frames to be assembled automatically.

It is known that, in order to produce a frame from framing mouldings, a certain number of successive operations have to be carried out. Thus, in the first place, the mouldings have to be bevelled to the dimensions required for the frame. Then, these cut mouldings are placed together two by two to form a corner, and held thus firmly in place so that they can be fastened together. When two corners have been fastened, they then have to be positioned against one another for a further fastening operation. Then the frame obtained is moved from the work table to make room for another assembly operation.

The operations, which are carried out manually, using tools such as cutting members, supporting stops and fastening heads, require the operator to perform a series of manipulations and positioning operations that are tiresome, delicate and time consuming, to the detriment of cost effectiveness. Document FR 2 674 789 discloses a process for obtaining articles using these operations.

The processes thus used hitherto do not permit the swift series assembly of frames, although this is increasingly in demand, in particular in the fields of information and advertising, and, more precisely, industrial frames, frames for photographs, etc.

The invention aims to overcome these drawbacks by providing an automatic machine for assembling frames, adaptable to different types of moulding, capable of producing frames of all sizes using fasteners of suitable size and shape.

The main object of the invention is thus an automatic machine for assembling frames using cutting members, supporting stops and fastening heads, which machine comprises two independent fastening stations, the first station, which is designed to assemble the corners of the frames separately and successively, being provided with two cutting heads displaceable in two orthogonal directions for cutting the mouldings forming the corners of the frame, as well as with a fastening head and devices for holding said mouldings in place, the second station, which is designed for final assembly of the frame, being provided with two fastening heads and devices for holding in position the corners produced by the first station, and transfer mechanisms being provided to move the corners from the first station to the second one, and to move out the finished frame.

According to particular characteristics of the invention, bead feeding mechanisms are associated with the cutting heads.

Furthermore, the fastening heads are mounted on a mobile plate with which a fastener dispenser is associated. Finally, advantageously, the devices for holding the mouldings at the first station are constituted by stops that are perpendicular to one another and located in the vicinity of one another, as well as by clamping jaws in the angle formed by the stops.

According to another characteristic of the invention, the fastening heads of the second station are installed facing each other along the diagonal of the frame to be produced and also mounted on mobile plates which are each associated with a fastener dispenser.

Other particular characteristics and advantages of the invention will emerge from the description that follows of a non-limitative exemplary embodiment in which reference is made to the annexed drawings, wherein.

Figure 1:
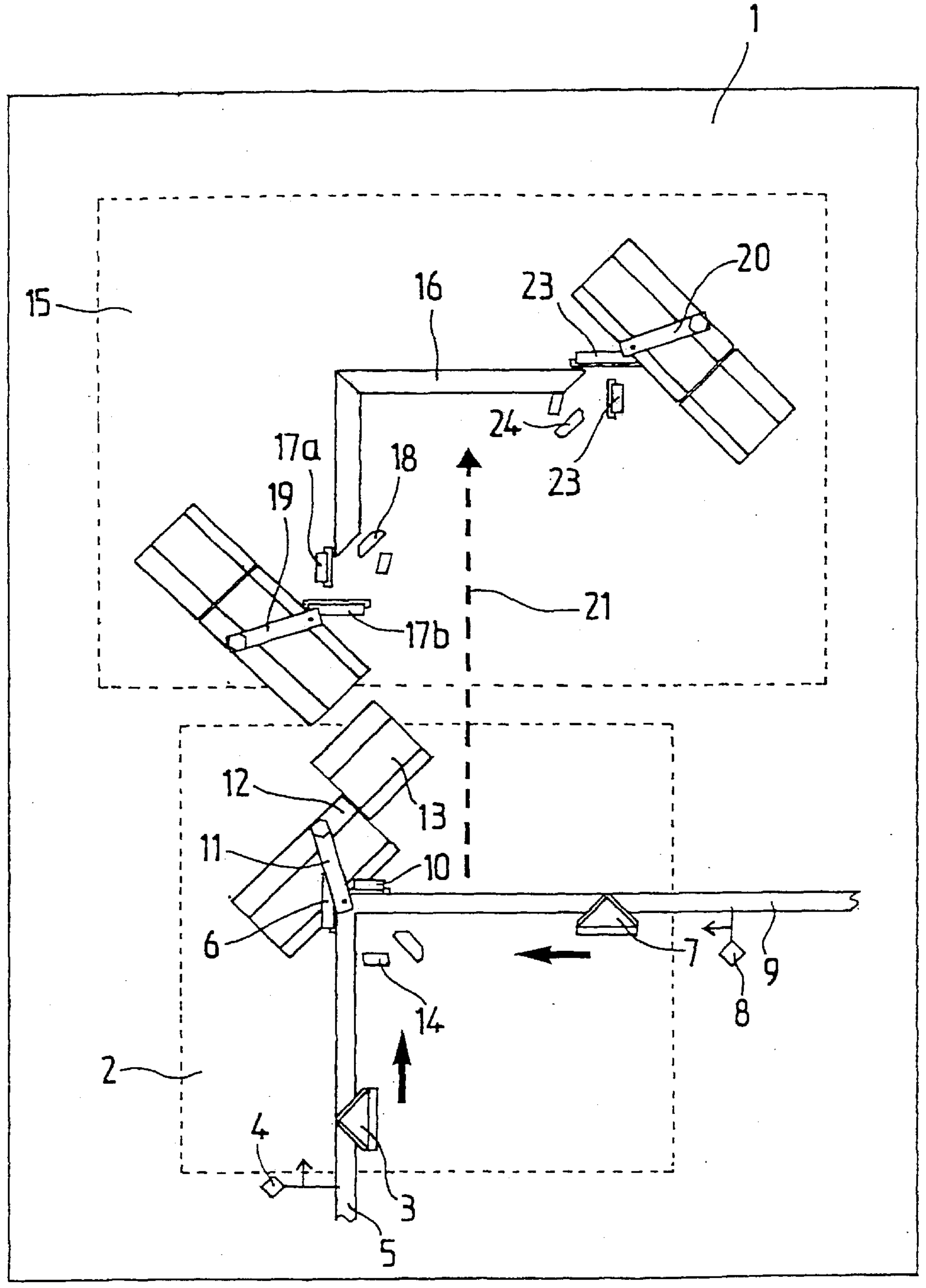
FIG. 1 is a schematic plan view of the work table of the machine.

It can be seen from FIG. 1 that work table 1 of the machine is provided with a first fastening and cutting station 2 equipped with a first cutting head 3 with a bead feeding mechanism 4, thus being detachable from the cutting head. The cutting head-mechanism assembly moves in the direction of the arrow by means of a controlled guide rail, not shown. This rail also serves to position a moulding 5 intended to form a width of the frame. For this purpose, the moulding is brought into the vicinity of a lateral stop 6 integral with the work table.

In an equivalent way, but in a direction perpendicular to the previous one, the first station 2 is equipped with a second cutting head 7 and with a bead feeding mechanism 8, provided for a moulding 9 forming a length of the frame. As before, moulding 9 is brought into the vicinity of a stop 10 perpendicular to stop 6 and placed next to it. The two cutting heads (3, 7) can thus be displaced in two orthogonal directions.

A fastening head 11 is mounted on a mobile plate 12 in the vicinity of the stops (6, 10), with which plate is associated a fastener dispenser 13. Head 11 is thus able to fasten together the two ends of the mouldings (5, 9). For this purpose, the table is provided with clamping jaws, in the angle formed by the stops. Station 2 thus described is designed to assemble the corners of the frame separately and successively. Finally, above the plane of the work table, and in the vicinity of the stops, are provided gripping members which form part of a mechanism for transferring the corners produced.

On the work table is also provided a second fastening station 15, designed to receive a first corner of the frame (generally designated by reference number 16) from first station 2. Two stops (17*a* and 17*b*) adjacent to clamping jaws 18 enable corner 16 to be immobilised. A fastening head 19 is positioned on table 1 in the vicinity of these stops (17*a*, 17*b*). Another fastening head, 20, is positioned on the table at the other end of the extremities of said corner 16, that is to say facing head 19 along the diagonal of the frame to be produced. These fastening heads are also mounted on mobile plates which are each associated with a fastener dispenser. In the area of head 20, second station 15 is also equipped with a set of orthogonal stops 23 and with clamping jaws 24, in a configuration equivalent to that of the stops 17*a*, 17*b* and jaws 18. This second station 15 is designed for final assembly of the frame.

The machine operates in the following way.

To assemble a first frame, in an initial stage, mouldings 5 and 9 are cut to obtain the first bevels, with this taking place at the time of introducing the mouldings in front of their respective cutting heads, 3 and 7, which have been positioned at the desired distance from the fastening head, according to the length and width selected for the frame. Then the bead feeding mechanisms (4, 8) move the mouldings until they are in the vicinity of the stops (6, 10). These mechanisms then release the mouldings and, at the same time, jaws 14 ensure that the mouldings are clamped against the stops and that their bevels are placed in contact with each other.

Concurrently, fastening head 11 will have been positioned over the joined mouldings. Finally, and simultaneously, head 11 fastens the mouldings and the cutting heads (5, 7) bevel them to the requisite dimensions.

The corner thus assembled is then transferred, after jaws 14 have been slackened, to the second fastening station 15, while other mouldings are introduced into station 2 to assemble a second corner. To be able to effect this transfer and this further introduction, it is quite clearly necessary also to unlock immobilising systems 4 and 8, and to move back plate 12. First corner 16 is thus, after being lifted using the gripping members, transferred by translation, in the direction of arrow 21, to second fastening station 15, where it is placed against stop 17*a*. During this time, further mouldings (5, 9) will have been positioned at station 2 to be, in their turn, assembled and cut according to the same process as already described above.

The second corner being thus assembled, it has to be transferred to the second station 15, for final fastening of the frame, while further moulds are positioned at station 2 to prepare a second frame.

Figure 2:
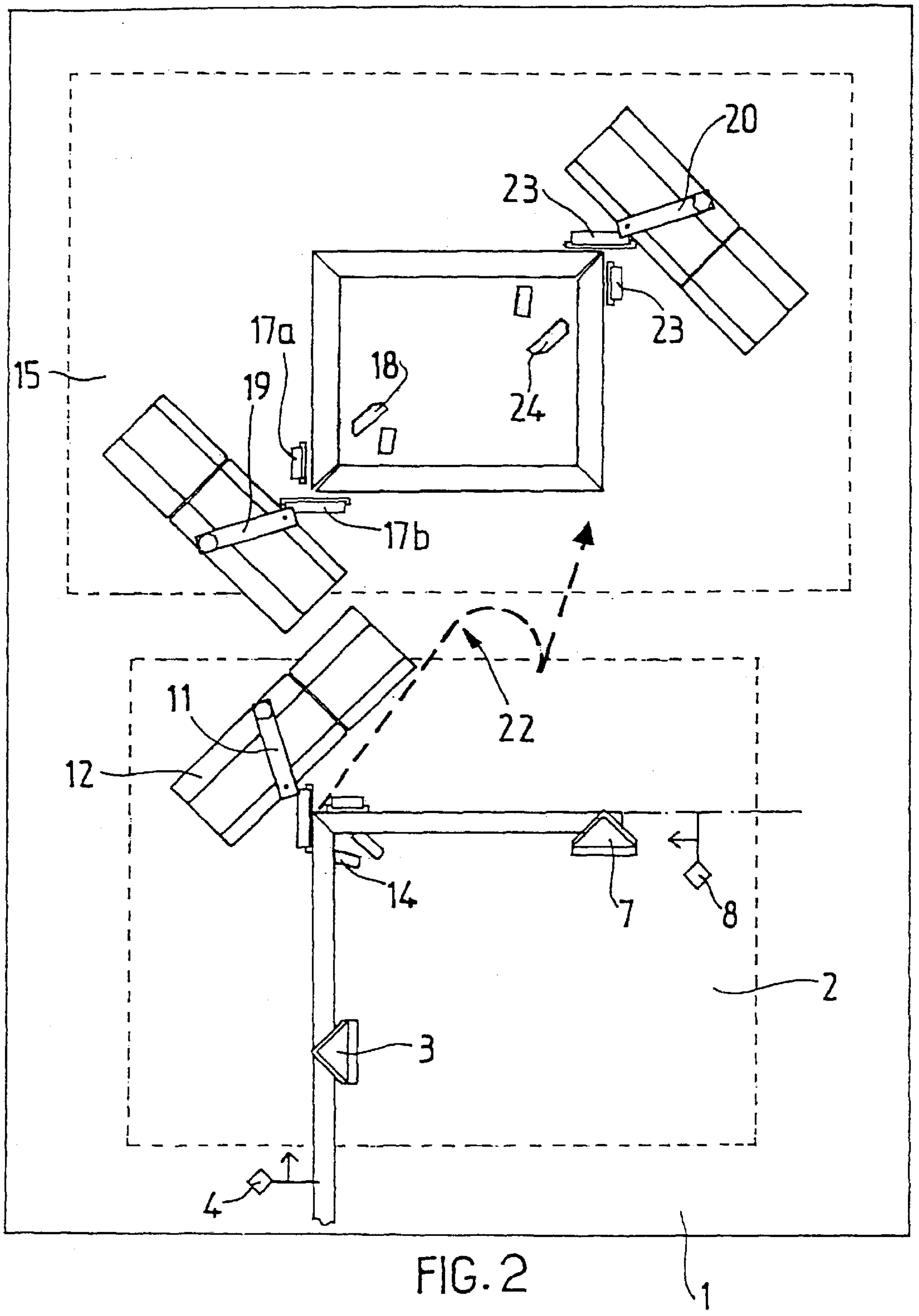
FIG. 2 is a schematic plan view, according to FIG. 1, showing the preparation of a corner at the first fastening station, and the transfer of a corner to the second fastening station.

FIG. 2 illustrates this particular step.

As before, jaws 14 are slackened, the bead feeding mechanisms (4, 8) are moved up, and plate 12 and its fastening head 11 are moved back so that the second corner is released. It is then transferred to final fastening station 15 in a combined movement of translation and rotation in the direction of arrow 22. The second corner thus takes up position at station 15, as shown in FIG. 2. It will be noted that fastening heads (19, 20) are moved away from the mouldings and that the jaws (18, 24) are slackened. At the same time, the next mouldings will have been moved up to station 2 to be assembled and cut, according to the same process.

Figure 3:
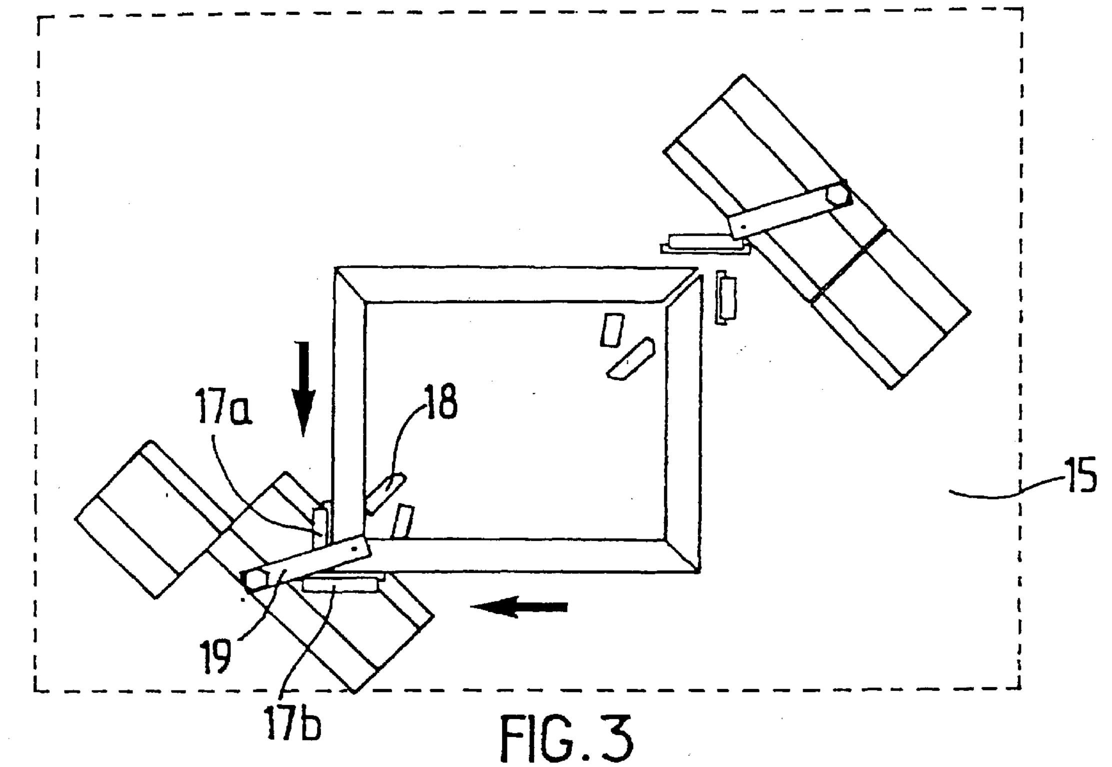
FIG. 3 is a partial schematic view, according to FIG. 1, showing the fastening of a corner at the second fastening station.

Next, a third corner of the frame is fastened by fastening head 19, as can be seen from FIG. 3. For this purpose, the two corners placed at station 15 have been brought into contact, in the area of head 19, by moving them in the direction of the arrows. Corresponding jaws 18 are then clamped so that the corners are pressed against one another and so as to bear against the stops (17*a* and 17*b*). The head is then positioned correctly so that the third corner can be fastened.

Figure 4:
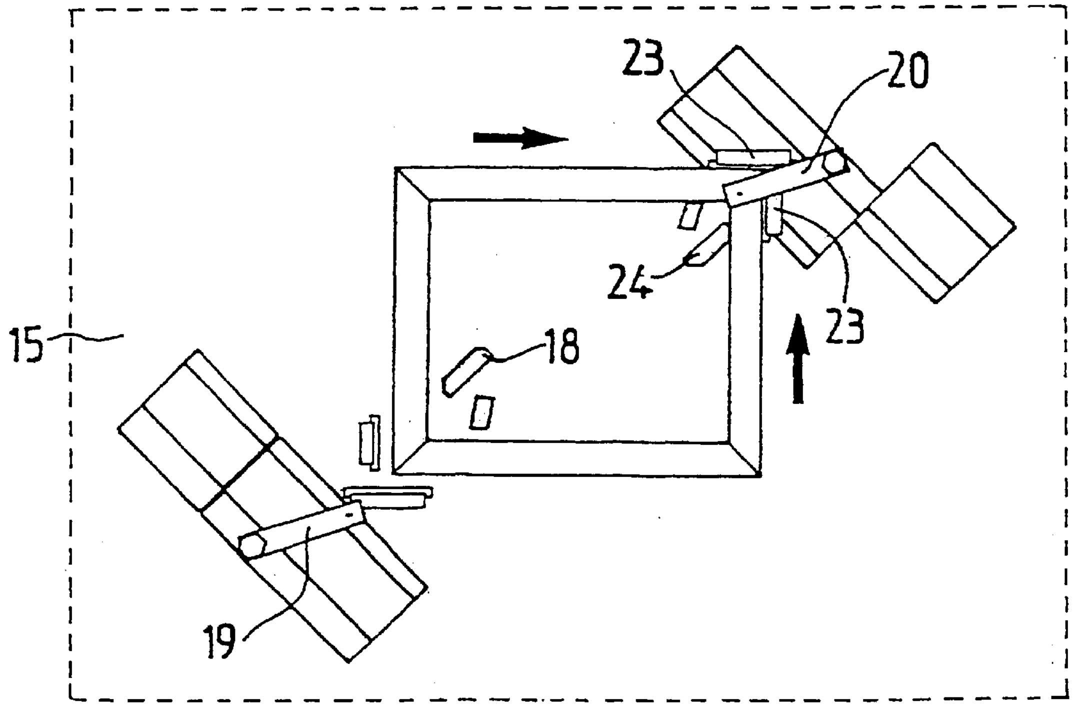
FIG. 4 is a partial schematic view, according to FIG. 1, showing the final fastening of the frame at the second fastening station.

A similar operation is then carried out for final fastening of the frame, as illustrated in FIG. 4.

Firstly, fastening head 19 is moved back and adjacent jaws 18 are slackened. Then, the two corners are moved, as indicated by the arrows, in the direction of stops 23 on fastening head 20 side. The corresponding jaws 24 are then clamped and head 20 is positioned before final fastening of the frame. During clamping, the transfer mechanism takes up its position again above station 2.

The final operation is to eject the finished frame, out of station 15, after moving back fastening head 20 and slackening the jaws (18, 24).

The frame is then transferred onto the work table or to a point in its vicinity, away from the fastening stations. At the same time, the first corner of the second frame is transferred by translation to station 15, this first corner having been assembled at the same time as the final fastening of the first frame.

Then the cycle continues as described above. The machine described is thus an assembling machine with three fastening heads (11, 19, 20) and two cutting heads (3, 7) integrated in the first fastening station 2. Each head is supplied from its own box of fasteners and further has at its disposal a supply magazine. Dispenser 13 of head 11 has a capacity that is twice that of the other heads, 19 and 20, of station 15. The latter two heads perform only one fastening operation for the same frame, in fact, while head 11 performs two of them. It is thus arranged for all the stations to have identical operating independence. The machine is thus capable of effecting fastening operations simultaneously at both stations 2 and 15, as well as simultaneous transfers of corners or frames and/or the introduction of mouldings. Transfer mechanisms are thus provided for moving the corners from the first station to the second, as well as for moving out the finished frame. Thus the rhythm obtained permits the series fastening of frames.

What is claimed is:

1. Automatic machine for assembling rectangular frames using cutting members, supporting stops and fastening heads, comprising:

two independent fastening stations (2, 15), wherein a first of the fastening stations (2), which is designed to assemble first and second of the corners of one of the frames separately and successively, is provided with two cutting heads (3, 7) displaceable in orthogonal directions relative to one another for cutting moldings (5, 9) forming the corners of the frames, as well as with a fastening head (11) and devices (6, 10, 14) for holding said moldings in place during fastening with the fastening head, and wherein a second of the fastening stations (15), which is designed for final assembly of the frame, is provided with two fastening heads (19, 20) positioned for fastening third and fourth opposite corners of the one frame, and is provided with devices (17, 18, 23, 24) for holding the first and second corners produced by the first station in a position such that members forming the first and second comers are arranged to form the third and fourth opposite corners of the one rectangular frame, and wherein transfer mechanisms are provided to move the assembled first and second comers from the first station to the second one such that said third and fourth comers are formed, and to move out the finished frame from the second station.

2. Automatic assembling machine according to claim 1, characterized in that bead feeding mechanisms (4, 8) are associated with the cutting heads (3, 7).

3. Automatic assembling machine according to claim 1, characterized in that the fastening heads (11, 19, 20) are each mounted on a mobile plate (12) with which is associated a fastener dispenser (13).

4. Automatic assembling machine according to claim 1, characterized in that the devices for holding the moldings at the first station (2) are constituted by stops (6, 10) perpendicular to one another and located in the vicinity of one another, as well as by two clamping jaws in the angle formed by the stops.

5. Automatic assembling machine according to claim 1, characterized in that the fastening heads (19, 20) of the second station (15) are installed facing each other along the diagonal between the third and fourth corners of the frame to be produced and are also installed each mounted on a mobile plate that is associated with a fastener dispenser.

6. Automatic assembling machine according to either of claims 1 or 5, characterized in that the devices for holding in position, at the second station (15), the corners produced by the first station (2) are constituted by sets of stops (17, 23) adjacent to clamping jaws (18, 24).

7. Automatic assembling machine according to claim 1, characterized in that the transfer mechanisms move one of the corners from the first station (2) to the second station (15) by combined movements of translation and rotation.

8. Automatic assembling machine according to claim 1, characterized in that each fastening head (11, 19, 20) is equipped with a fastener dispenser (13), the fastener dispenser of the head (11) of the first station (2) having a capacity that is twice that of the other heads (19, 20) of the second station (15).

* * * * *